United States Patent
Han et al.

(10) Patent No.: US 7,840,083 B2
(45) Date of Patent: Nov. 23, 2010

(54) METHOD OF ENCODING FLAG, METHOD OF DECODING FLAG, AND APPARATUS THEREOF

(75) Inventors: Woo-jin Han, Suwon-si (KR); Bae-keun Lee, Bucheon-si (KR); Tammy Lee, Seoul (KR); Kyo-hyuk Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1032 days.

(21) Appl. No.: 11/599,484

(22) Filed: Nov. 15, 2006

(65) Prior Publication Data

US 2007/0160302 A1 Jul. 12, 2007

Related U.S. Application Data

(60) Provisional application No. 60/758,218, filed on Jan. 12, 2006, provisional application No. 60/759,061, filed on Jan. 17, 2006.

(30) Foreign Application Priority Data

Apr. 19, 2006 (KR) .................. 10-2006-0035461

(51) Int. Cl.
*G06K 9/36* (2006.01)
*G06K 9/46* (2006.01)
*G06K 9/00* (2006.01)

(52) U.S. Cl. ....................... 382/240; 382/246

(58) Field of Classification Search .......... 382/164, 382/173, 232, 233, 240, 244, 246, 248, 284; 375/240.01, 240.08, 240.12, 240.13, 240.2, 375/240.23, 240.24, 240.25, E7.254; 348/384, 348/390, 400–402, 500

See application file for complete search history.

(56) References Cited

U.S. PATENT DOCUMENTS

| | | | |
|---|---|---|---|
| 6,330,280 B1 | 12/2001 | Suzuki et al. | |
| 6,363,211 B1* | 3/2002 | Kanota et al. | 386/96 |
| 6,614,845 B1 | 9/2003 | Azadegan | |
| 6,735,345 B2 | 5/2004 | Lin et al. | |
| 7,369,709 B2* | 5/2008 | Hsu et al. | 382/248 |
| 7,412,102 B2* | 8/2008 | Srinivasan et al. | 382/236 |
| 7,596,279 B2* | 9/2009 | Sugimoto et al. | 382/238 |
| 2004/0234144 A1 | 11/2004 | Sugimoto et al. | |
| 2007/0160302 A1* | 7/2007 | Han et al. | 382/240 |
| 2007/0297518 A1* | 12/2007 | Han et al. | 375/240.24 |
| 2008/0219578 A1* | 9/2008 | Lee | 382/247 |

OTHER PUBLICATIONS

Communication from the State Intellectual Property Office of P.R. China issued Jun. 23, 2010, in counterpart Chinese Application No. 200680050918.0.

* cited by examiner

*Primary Examiner*—Amir Alavi
(74) *Attorney, Agent, or Firm*—Sughrue Mion, PLLC

(57) ABSTRACT

A method of encoding flags, a method of decoding flags and an apparatus thereof, in which flag encoding and decoding can be efficiently performed by using spatial correlation between various flags included a plurality of blocks are provided. The method includes collecting flag values respectively allocated to groups of the plurality of blocks according to spatial correlation of blocks to create a flag bit-string, dividing the flag bit-string into a plurality of divided bit-strings using a group size, setting a pattern bit indicating whether all bits included in the divided bit-strings are 0 or not, and performing entropy coding on the divided bit-strings according to the set pattern bit.

18 Claims, 12 Drawing Sheets

METHOD OF ENCODING FLAG, METHOD OF DECODING FLAG, AND APPARATUS THEREOF

CROSS REFERENCE TO RELATED APPLICATION

This application claims priority from Korean Patent Application No. 10-2006-0035461 filed on Apr. 19, 2006 in the Korean Intellectual Property Office, and U.S. Provisional Patent Application No. 60/758,218 filed on Jan. 12, 2006 and 60/759,061 filed on Jan. 17, 2006, respectively, in the United States Patent and Trademark Office, the disclosures of which are incorporated herein by reference in their entirety.

BACKGROUND OF THE INVENTION

1. Field of the Invention

Methods and apparatuses consistent with the present invention relate to encoding flags and decoding flags. More particularly, the present invention relates to flag encoding and decoding which can be efficiently performed by using spatial correlation between various flags included in macroblocks.

2. Description of the Related Art

With the development of information communication technology, including the Internet, video communication as well as text and voice communication, has increased dramatically. Conventional text communication cannot satisfy users' various demands, and thus, multimedia services that can provide various types of information such as text, pictures, and music have increased. However, multimedia data requires storage media that have a large capacity and a wide bandwidth for transmission because the amount of multimedia data is usually large. Accordingly, a compression coding method is requisite for transmitting multimedia data including text, video, and audio.

A basic principle of data compression is to remove data redundancy. Data can be compressed by removing spatial redundancy in which the same color or object is repeated in an image, temporal redundancy in which there is little change between adjacent frames in a moving picture frame or the same sound is repeated in audio, or mental visual redundancy which takes into account human eyesight and its limited perception of high frequency. In general video coding, temporal redundancy is removed by temporal filtering based on motion estimation, and spatial redundancy is removed by spatial transform.

Lossy encoding is performed on the result obtained by removing data redundancy according to quantization steps of a quantization process. Lossless encoding is finally performed on the quantized result by entropy coding.

Examples of an entropy coding mode now used in an H.264 standard include CAVLC (Context-Adaptive Variable Length Coding), CABAC (Context-Adaptive Binary Arithmetic Coding), Exp_Golomb (exponential Golomb), and the like. The following Table 1 shows entropy coding modes used for every parameter coded with the H.264 standard.

TABLE 1

| Coded parameter | Entropy_coding_mode = 0 | Entropy_coding_mode = 1 |
| --- | --- | --- |
| Macroblock type | Exp_Golomb | CABAC |
| Macroblock pattern | | |
| Quantization parameter | | |
| Reference frame index | | |
| Motion vector | | |
| Residual data | CAVLC | |

In Table 1, if an entropy_coding_mode flag is 0, a macroblock type indicating whether a corresponding macroblock is in an inter-prediction mode or an intra-prediction mode, a macroblock pattern indicating types of sub-blocks constituting a macroblock, a quantization parameter serving as an index for determining a quantization step, a reference frame index indicating a number of frames referenced in the inter-prediction mode, and a motion vector are encoded by Exp_Golomb. In addition, residual data that indicates the difference between an original image and a prediction image is encoded by CAVLC.

In contrast, if the entropy_coding_mode flag is 1, all the parameters are encoded by CABAC.

The CABAC represents a superior performance in parameters having high complexity. Accordingly, VLC (Variable Length Coding) based entropy coding, such as CAVLC, is set as a fundamental profile.

Meanwhile, in the H.264 or multi-layer based scalable video coding (also referred to as H.264SE (scalable edition)), there are various flags related to whether inter-layer information is used. These flags are set for each of slices, macroblocks, or sub-blocks. Accordingly, overhead increased by the flags cannot be ignored in video coding.

However, as opposed to the text data or the motion data, the flags are currently encoded without taking into consideration of spatial correlation thereof or not encoded.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

According to an aspect of the present invention, there is provided a method of encoding flags, a method of decoding the same and an apparatus thereof, in which various flags used in a video codec can be efficiently encoded while using spatial correlation thereof.

Aspects of the present invention are not limited to the above-mentioned aspects, and other aspects of the present invention will be apparently understood by those skilled in the art through the following description.

According to a first aspect of the present invention, there is provided a method of encoding flags that are used for coding a video frame having a plurality of blocks. The method includes collecting flag values respectively allocated to groups of the plurality of blocks according to spatial correlation of specified blocks to create a flag bit-string, dividing the flag bit-string with a group size, setting a pattern bit indicating whether all bits included in the divided bit-strings are 0 or not, and performing entropy coding on the divided bit-strings according to the set pattern bit.

According to a second aspect of the present invention, there is provided a method of encoding flags that are used for coding a video frame having a plurality of layers. The method includes performing an exclusively OR operation for first flag values for blocks at a current layer and second flag values for blocks at a LOWER layer corresponding to the blocks at the current layer, collecting the operation result values according to spatial correlation of the blocks at the current layer to create a flag bit-string, dividing the flag bit-string with a group size, setting a pattern bit indicating whether all bits included in the divided bit-strings are 0 or not, and performing entropy coding on the divided bit-strings according to the set pattern bit.

According to a third aspect of the present invention, there is provided a method of decoding flags that are used for coding a video frame having a plurality of blocks. The method includes reading from the video stream a pattern bit indicating whether all bits included in a bit-string are 0 or not, setting, when the pattern bit has a first bit, a flag bit-string corresponding to a group size to 0, reading, when the pattern bit has a second bit, an encoded flag bit-string for blocks according to the group size from the video stream, and performing entropy decoding on the read flag bit-string.

According to a fourth aspect of the present invention, there is provided an apparatus for encoding flags that are used for coding a video frame having a plurality of blocks. The apparatus includes a bit-string creating unit collecting flag values respectively allocated to groups of the plurality of blocks according to spatial correlation of specified blocks to create a flag bit-string, a bit-string dividing unit dividing the flag bit-string with a group size, a pattern bit setting unit setting a pattern bit indicating whether all bits included in the divided bit-strings are 0 or not, and an entropy coding unit performing entropy coding on the divided bit-strings according to the set pattern bit.

According to a fifth aspect of the invention, there is provided an apparatus for encoding flags that are used for coding a video frame having a plurality of layers. The apparatus includes an exclusively OR operation unit performing an exclusively OR operation for first flag values for blocks at a current layer and second flag values for blocks at a LOWER layer corresponding to the blocks at the current layer, a flag bit-string creating unit collecting the operation result values according to spatial correlation of the blocks at the current layer to create a flag bit-string, a bit-string dividing unit dividing the flag bit-string with a group size, a pattern bit setting unit setting a pattern bit indicating whether all bits included in the divided bit-strings are 0 or not, and an entropy coding unit performing entropy coding on the divided bit-strings according to the set pattern bit.

According to a sixth aspect of the present invention, there is provided an apparatus for decoding flags that are used for coding a video frame having a plurality of blocks. The apparatus includes a pattern bit reading unit reading from the video stream a pattern bit indicating whether all bits included in a bit-string are 0 or not, a flag bit-string setting unit, when the pattern bit has a first bit, setting a flag bit-string corresponding to a group size to 0, a flag bit-string reading unit, when the pattern bit has a second bit, reading an encoded flag bit-string for blocks according to the group size from the video stream, and an entropy decoding unit performing entropy decoding on the read flag bit-string.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

Figure 1:
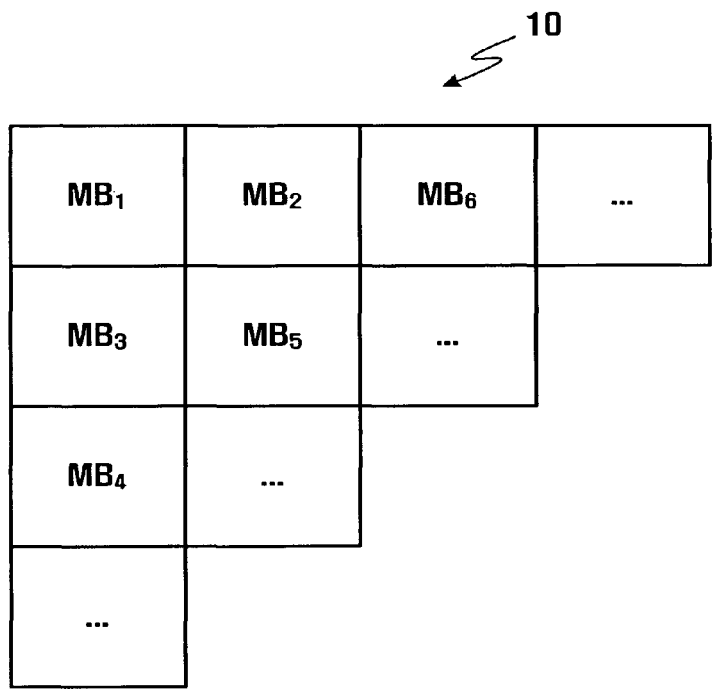
FIG. 1 is a diagram illustrating macroblocks forming one frame according to an exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these embodiments are provided so that this disclosure will be thorough and complete and will fully convey the concept of the present invention to those skilled in the art, and the present invention will only be defined by the appended claims. Like reference numerals refer to like elements throughout the specification.

As compared with the conventional MPEG-4 or H.264, scalable video coding has increased an amount of syntax elements. Each syntax element has a capacity of one bit or several bits, but if focusing on an entire video stream, it is also difficult to ignore overhead due to the syntax elements. The present invention focuses on a method in which in the video coding, the same flags (syntax elements) existing in every block (slice, macroblock or sub-block) are collected and then collectively encoded, thereby reducing overhead due to the flags.

Figure 2:
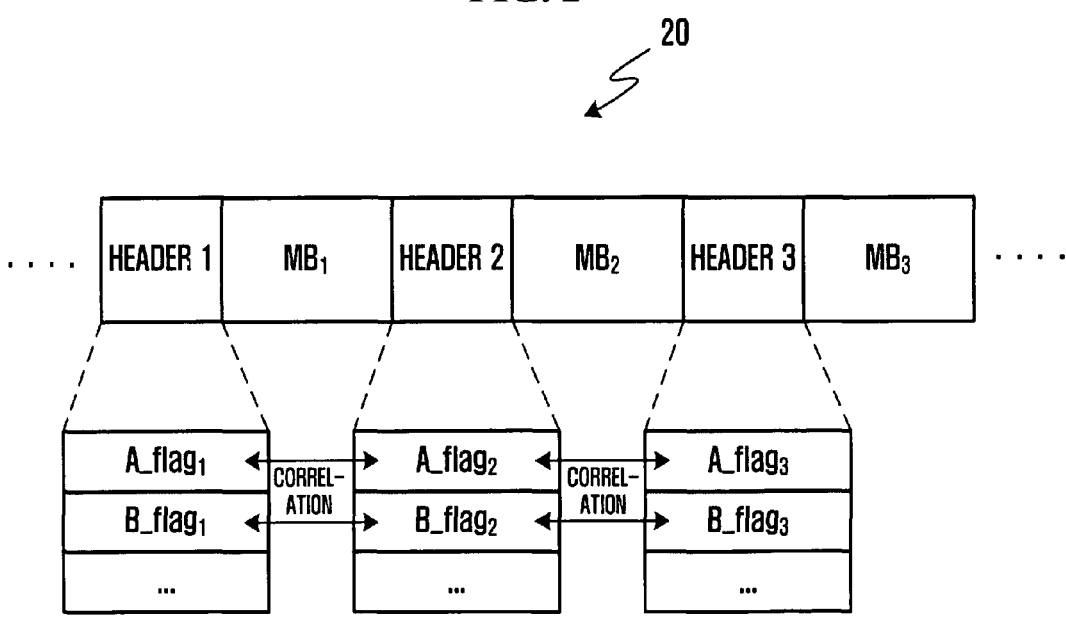
FIG. 2 is a diagram illustrating spatial correlation between specific flags included in each macroblock header according to an exemplary embodiment of the present invention.
Figure 3:
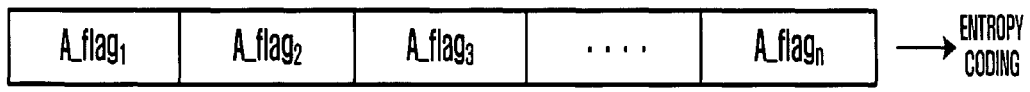
FIG. 3 is a diagram illustrating a concept for collecting the same flag values and performing entropy coding on the collected flags according to an exemplary embodiment of the present invention.

FIGS. 1 to 3 are diagrams illustrating a basic concept of the present invention.

In video coding, a process is generally performed in a unit of a macroblock having pixel sizes of 16×16. As shown in FIG. 1, one frame or slice is divided into a plurality of macroblocks $MB_n$ (n is a natural number). The respective macroblocks become a video stream through a lossy/lossless encoding process. For example, the macroblocks may be encoded in a zigzag scanning order, as shown in FIG. 1.

As such, headers (macroblock headers) are added to the heads of the encoded macroblocks $MB_n$, and then the macroblocks are collected, thereby forming one video stream 20 shown in FIG. 2. Each of the headers includes various flags $A\_flag_n$, $B\_flag_n$, and the like. Each of the headers has the same flags, but values of the flags may differ. However, macroblocks that are spatially adjacent to one another have spatial correlation and affinity. Accordingly, in the adjacent macroblocks, the same flags may have the same value. For example, a coded block pattern (cbp) flag indicating whether a corresponding macroblock is coded or not has large spatial correlation. In the H.264 standard and the SVC standard, the cbp flag is defined as a parameter g_aucCbpInter in the case of an inter-macroblock, and defined as a parameter g_aucCbpIntra in the case of an intra-macroblock.

As a result, a method in which values (bit-strings) of the same flags are collected and then collectively coded is suggested. For example, as shown in FIG. 3, values $A\_flag1$, $A\_flag2, \ldots$, and $A\_flag_n$ of A_flags are collected and coded, and values $B\_flag1$, $B\_flag2, \ldots$, and $B\_flag_n$ of B_flags are collected and subjected to an entropy coding (lossless coding) process. As such, if the values of the same flags are collected to collectively code them, it can be easily predicted that compression efficiency is improved due to like relationship to affinity between the flag values, as compared with a case in which the flag values are individually coded.

Figure 4:
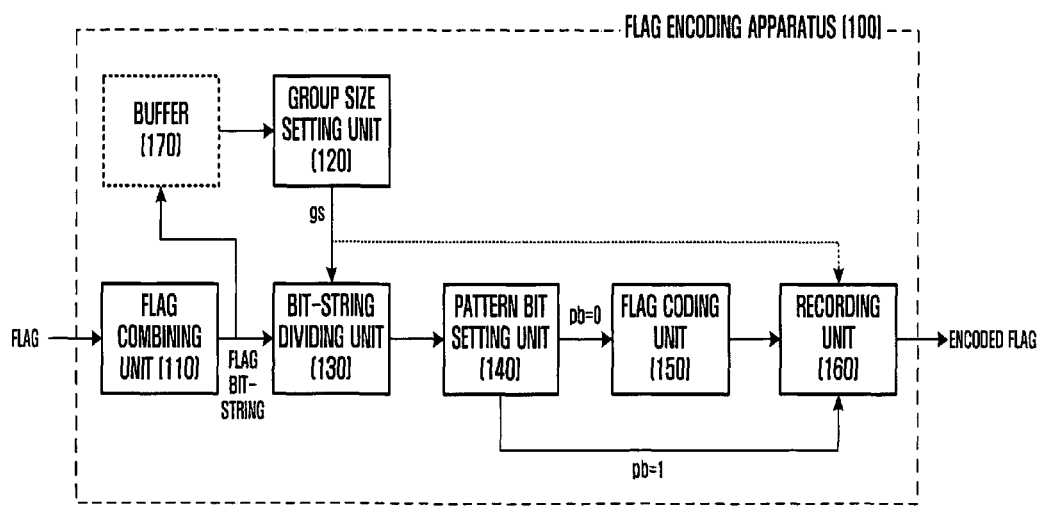
FIG. 4 is a block diagram illustrating a structure of a flag encoding apparatus according to an exemplary embodiment of the present invention.

In the following, algorithms by which the collected flag values (hereinafter, referred to as "flag bit-strings") are subjected to an entropy coding process will be described. FIG. 4 is a block diagram illustrating a structure of a flag encoding apparatus 100 according to an exemplary embodiment of the present invention.

The flag encoding apparatus 100 includes a group size setting unit 120, a flag combining unit 110, a bit-string dividing unit 130, a pattern bit setting unit 140, a flag coding unit 150, and a recording unit 160. Further, the flag encoding apparatus 100 may further include a buffer 170.

The flag combining unit 110 collects values of specific flags of each macroblock, and creates a flag bit-string, as shown in FIG. 3. In this case, the flag refers to a flag that is generally represented by one bit, but may be a flag that is represented by two bits or more.

The group size setting unit 120 sets a group size gs that becomes a unit for dividing a flag bit-string. The group size is represented by the number of bits, and may be, for example, 4, 8, or 16. If the number of 0 is large in the distribution of the specific flag values, the group size is preferably set to a large value. The group size may be set to a unit of macroblocks having the number, and at this time, it may be set for each slice or frame that is formed by a plurality of macroblocks. In this case, a gs value may be recorded on a slice header or a frame header.

The bit-string dividing unit 130 divides a flag bit-string inputted by the flag combining unit 110 in accordance with the group size (gs value) set by the group size setting unit 120.

Then, the bit-strings that are divided in a unit of the group size are inputted to the pattern bit setting unit 140.

If all the divided bit-strings are 0, the pattern bit setting unit 140 sets a bit (hereinafter, referred to as pattern bit pb) to 1 so as to be subjected to an entropy coding process, and if a portion of all the divided bit-strings is 0, the pattern bit setting unit 140 sets the pattern bit to 0 so as not to be subjected to the entropy coding process.

If the pattern bit is set to 0, that is, values other than 0 exist in the divided bit-strings, the flag coding unit 150 allows the divided bit-strings to be subjected to the entropy coding (losses coding) process. As the entropy coding, variable length coding, arithmetic coding, and the like, which have been already known, may be used. Further, although each of the divided bit-strings may be subjected to the entropy coding, all the divided bit-strings containing values other than 0 may be collected again and then collectively subjected to the entropy coding process.

The meaning of when the pattern bit is 0 may be opposite to the meaning of when the pattern bit is 1. Accordingly, in the specification, one of two values that can be represented by one bit may be represented by a first bit, and the other may be represented by a second bit.

The recording unit 160 records the group size gs and the pattern bit pb on the video stream. The group size gs may be recorded in a unit of a slice or a frame, and the pattern bit pb may be recorded for macroblocks according to the group size gs. For example, when the group size is 4, the pattern bit may be recorded on a header of a first macroblock of four macroblocks. Further, when the pb is 0, the recording unit 160 also records the entropy coding result supplied by the flag coding unit 150. In the same manner as the pb, the entropy coding result may be recorded on the header of the first macroblock. In a case in which all the divided bit-strings are collected and then collectively subjected to the entropy coding process in the flag coding unit 150, the entropy coding result may be recorded on the slice header or the frame header.

In the above-described description, an example of recording the set group size gs and transmitting it has been described. However, if the group size gs is calculated by using common information in an encoding apparatus and a decoding apparatus, the group size gs does not need to be transmitted.

In another exemplary embodiment of the flag encoding apparatus 100, the group size setting unit 120 may confirm the distribution of the flag bit-strings for previously created macroblocks, and change the group size. For example, the group size setting unit 120 may select bits of a number from the accumulated flag bit-strings, and set the group size according to the relationship between a ratio occupied by 0 in the selected bits and a threshold value.

Specifically, if a ratio occupied by 0 in the selected bits is smaller than ⅓, the group size setting unit 120 sets the group size to 1, and if the ratio occupied by 0 in the selected bits is larger than ⅘, the group size setting unit 120 sets the group size to 8. In the other cases, the group size setting unit 120 sets the group size to 4.

As such, since the accumulated bits are information that can be known commonly in the flag encoding apparatus and the flag decoding apparatus corresponding to the flag encoding apparatus, the recording unit 160 does not need to record the set group size on the video stream.

Figure 5:
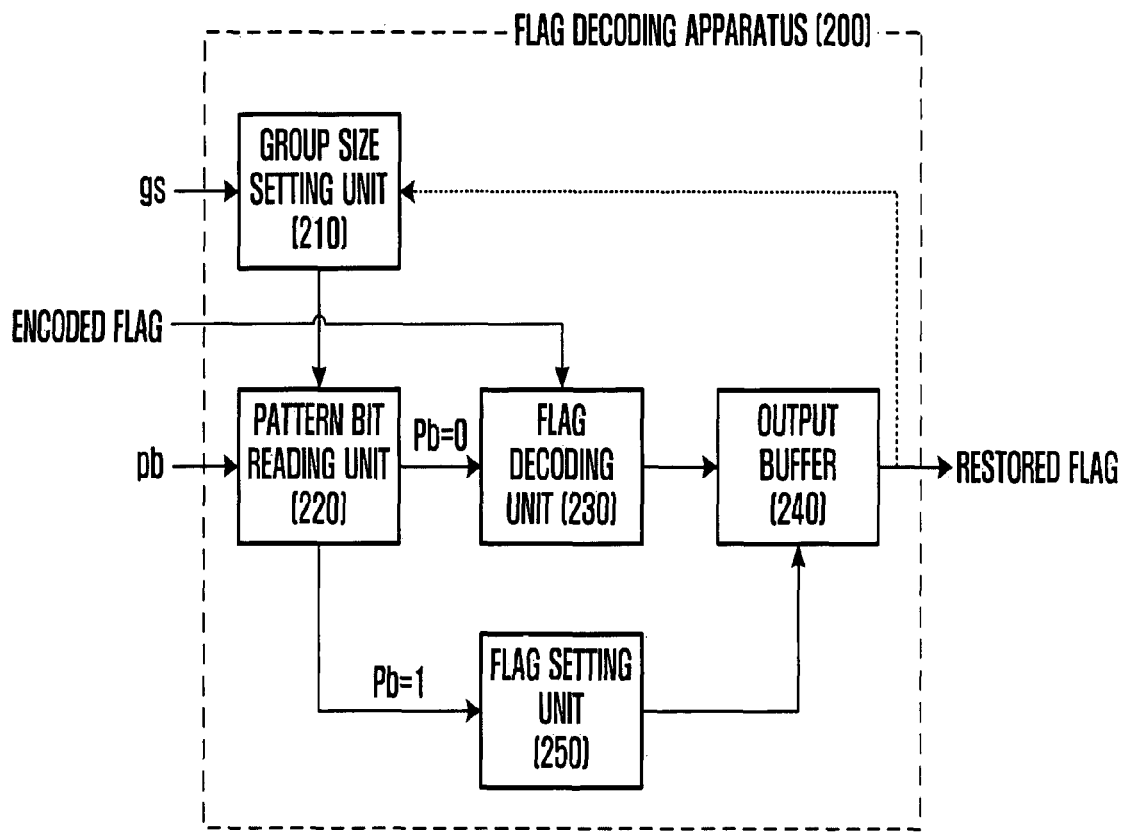
FIG. 5 is a block diagram illustrating a structure of a flag decoding apparatus according to an exemplary embodiment of the present invention.

FIG. 5 is a block diagram illustrating a structure of a flag decoding apparatus 200 according to an exemplary embodiment of the present invention.

The flag decoding apparatus 200 may include a group size setting unit 210, a pattern bit reading unit 220, a flag decoding unit 230, an output buffer 240, and a flag setting unit 250.

The group size setting unit 210 reads group size gs information contained in a video stream to set the group size. Alternatively, the group size setting unit 210 sets the group size through the distribution of previously restored flag values provided by the output buffer 240. The former corresponds to a case in which the flag encoding apparatus 100 records the group size and transmits it, and the latter corresponds to a case in which the flag encoding apparatus 100 sets the group size according to the bit distribution and does not transmit it. In a case of the latter, the group size setting unit 210 calculates the group size in the same manner as the group size setting unit 120 of the flag encoding apparatus 100.

The pattern bit reading unit 220 reads the value of the pattern bit pb contained in the video stream. Then, when the read value is 1, the pattern bit reading unit 220 notifies the read value to the flag setting unit 250, and when the read value is 0, the pattern bit reading unit 220 notifies the read value to the flag decoding unit 230.

When the value of the pb is notified as 0 by the pattern bit reading unit 220, the flag decoding unit 230 reads encoded flag bit-strings for blocks as many as the set group size (the entropy-encoded result in the flag decoding apparatus 200) from the video stream, and performs entropy decoding on it. The entropy decoding process is performed in reverse order of the entropy coding process performed by the flag coding unit 150.

When the value of the pb is notified as 1 by the pattern bit reading unit 220, the flag setting unit 250 sets all the flags corresponding to the group size to 0.

The output buffer 240 temporarily stores an entropy-decoded value by the flag decoding unit 230 and a value set by the flag setting unit 250. The stored values are outputted by the output buffer 240 as the restored flags.

Figure 6:
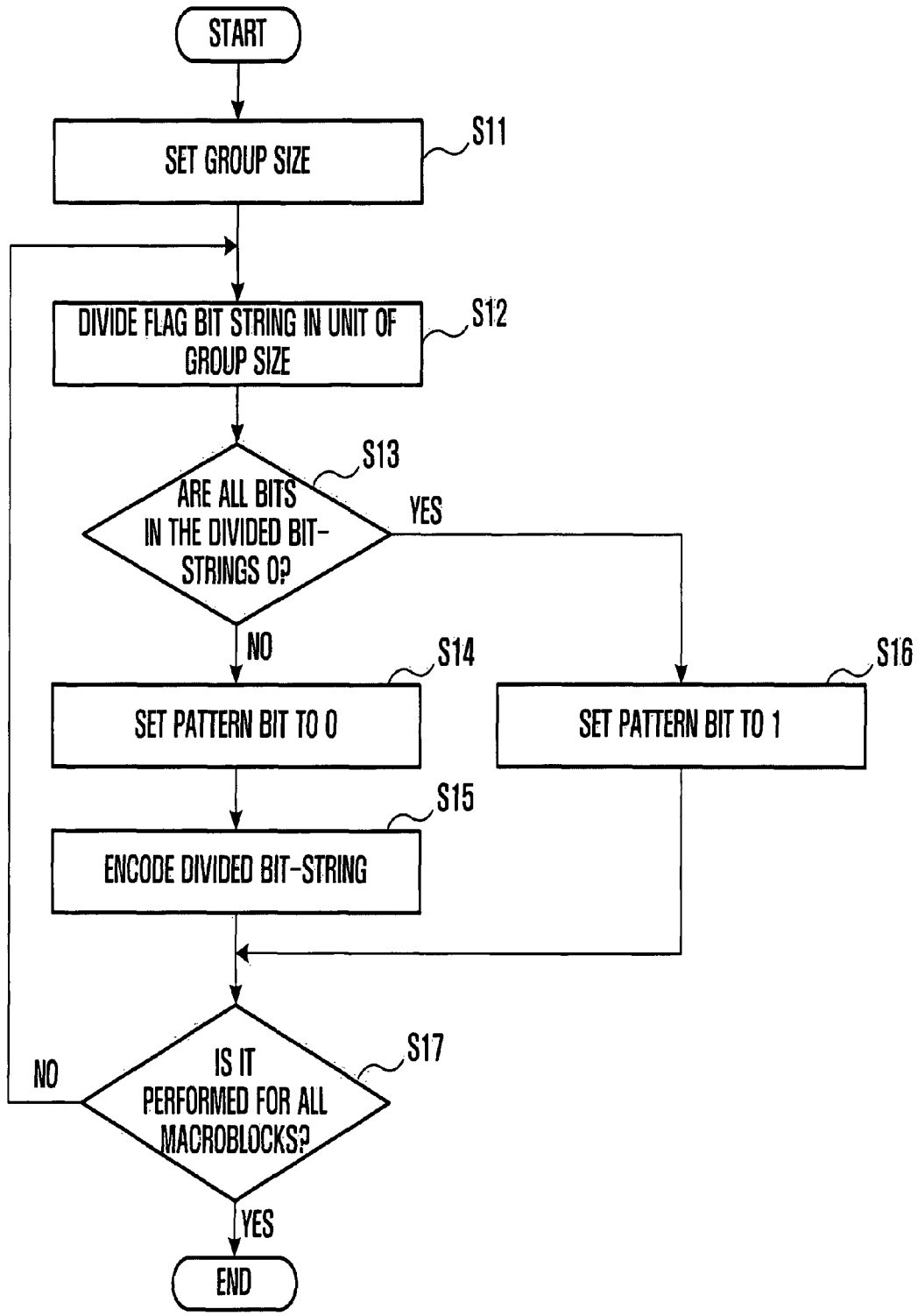
FIG. 6 is a flowchart illustrating a method of encoding flags according to an exemplary embodiment of the present invention.
Figure 9:
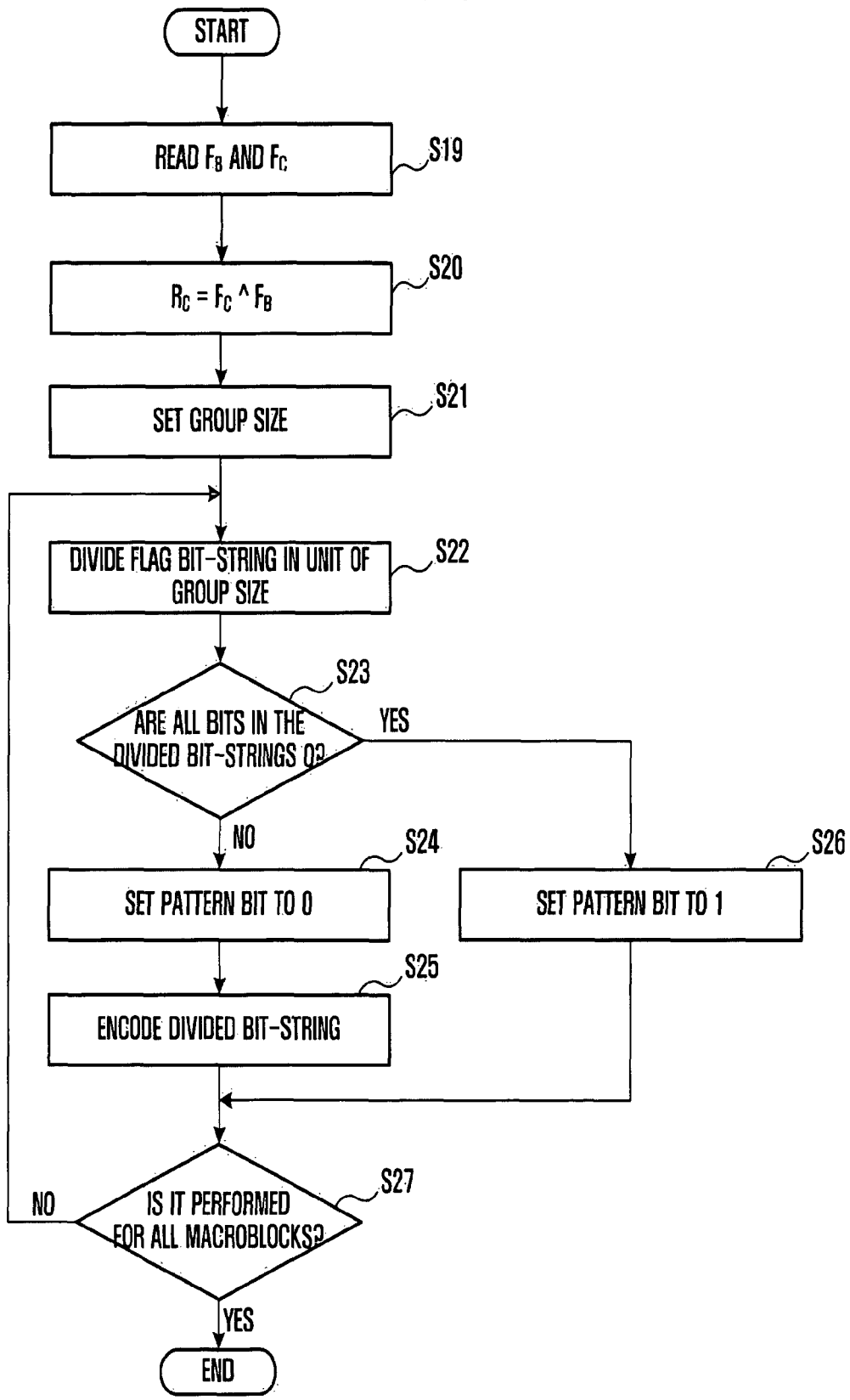
FIG. 9 is a flowchart illustrating a method of encoding a flag according to an exemplary embodiment of the present invention.

FIGS. 6 and 9 are flowcharts illustrating exemplary embodiments of the present invention. FIG. 6 is a flowchart illustrating a method of encoding flags according to an exemplary embodiment of the present invention.

First, the group size setting unit 120 sets a group size gs that serves as a unit for dividing a flag bit-string (S11). The group size may be, for example, 4, 8, or 16. The bit dividing unit 130 divides a flag bit-string in a unit of the group size (S12).

Then, the pattern bit setting unit 140 determines whether all the divided bit-strings are 0 (S13). In this case, when it is determined that all the divided bit-strings are 0, the pattern bit setting unit 140 sets the pattern bit pb to 1 (S16), and when it is determined that a portion of all the divided bit-strings is 0, the pattern bit setting unit 140 sets the pattern bit pb to 0 (S14).

When the pattern bit is set to 0, the flag coding unit 150 performs entropy coding on the divided bit-strings (S15). At this time, the flag coding unit 150 may perform entropy coding on each of the divided bit-strings, or collects all the divided bit-strings containing values other than 0 and then collectively performs entropy coding on them.

Lastly, if the above-mentioned steps are performed on all the macroblocks in the slice or frame (YES of S17), the process is completed, and if the above-mentioned steps are not performed on all the macroblocks, the process proceeds back to step S12.

Meanwhile, if a specific flag has only spatial correlation as shown in FIG. 2, a flag coding algorithm shown in FIG. 6 may be applied. In a multi-layer based video coding scheme like scalable video coding (SVC), a specific flag may have not only spatial correlation but also inter-layer correlation. For example, a residual prediction flag (residual_prediction_flag), an intra-base flag (intra_base_flag), a motion prediction flag (motion_prediction_flag), and a base mode flag (base_mode_flag) may have inter-layer correlation. Therefore, a value of a flag included in a macroblock at a current layer is likely to be equal to a value of a flag included in a macroblock at a LOWER layer that corresponds to the macroblock at the current layer.

The residual prediction flag is a flag that indicates whether residual prediction is used or not. The residual prediction corresponds to a method in which a residual signal of a layer is predicted by using a residual signal of a LOWER layer corresponding to the residual signal of the layer so as to reduce inter-layer redundancy between the residual signals. The LOWER layer corresponds to any other layer that is referenced for efficiently coding a layer. The LOWER layer is not limited to the first layer, and it is not necessarily a LOWER layer.

Whether the residual prediction is used is displayed by a residual prediction flag and transmitted to a terminal of a video decoder. If the flag is 1, it indicates that the residual prediction is used, and if the flag is 0, it indicates that the residual prediction is not used. Generally, if a flag is 1, it indicates that a corresponding function is used, and if the flag is 0, it indicates that the corresponding function is not used.

Figure 7:
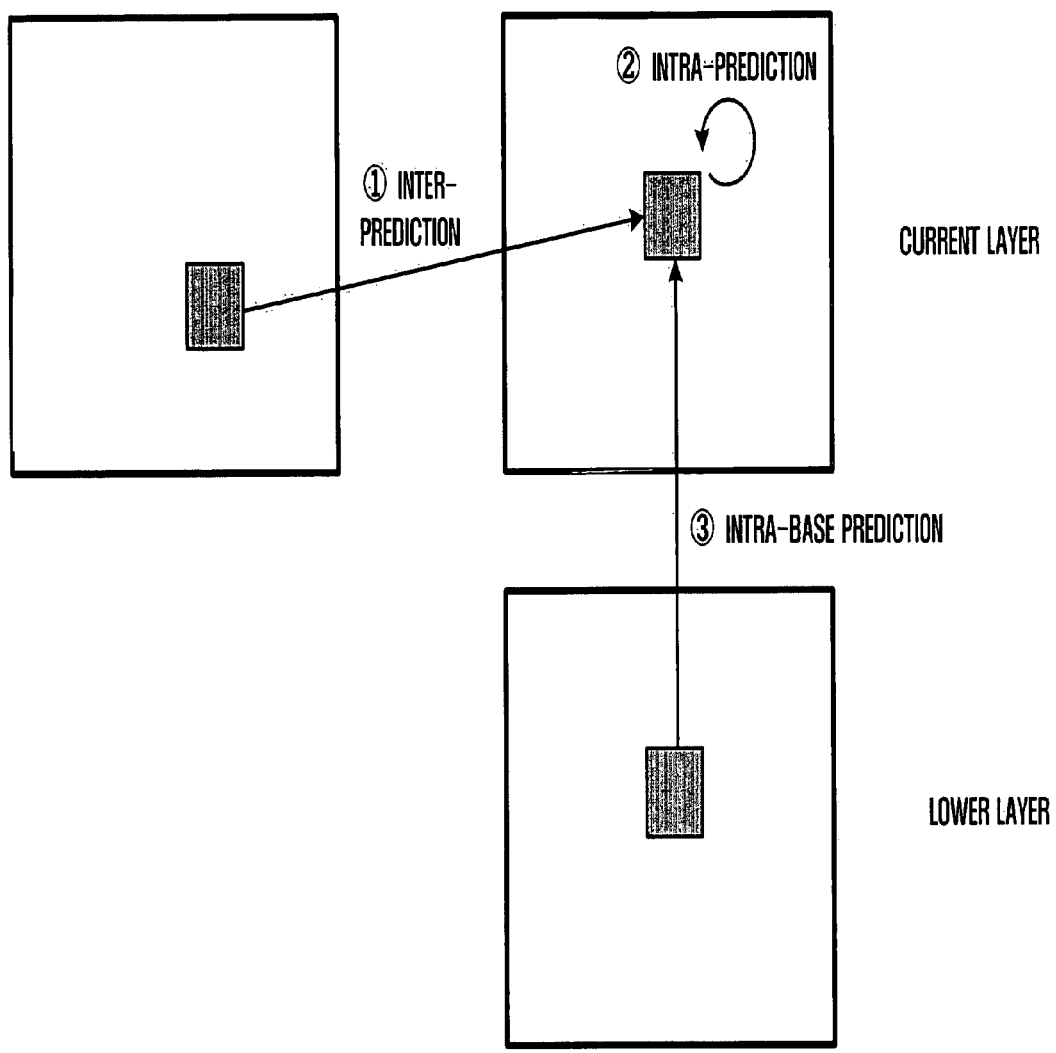
FIG. 7 is a diagram illustrating concepts of various prediction methods used in an SVC according to an exemplary embodiment of the present invention.

The intra-base flag is a flag that indicates whether intra-base prediction is used or not. Currently, in a scalable video coding draft, not only inter-prediction ① and intra-prediction ② used in the existing H.264 as shown in FIG. 7 but also intra-base prediction ③ for predicting a frame at a current layer using an image of a LOWER layer and reducing data to be coded are applied. In the scalable video coding draft, the intra-base prediction is handled with a kind of intra-prediction. In this case, if the intra-base flag is 0 in the intra-prediction, the conventional directional intra-prediction is displayed, and if the flag is 1 in the intra-prediction, the intra-base prediction is displayed.

The motion prediction flag is a flag that indicates whether another motion vector at the same layer is used or a motion vector at a LOWER layer vector is used in predicting the motion vector at the current layer to calculate the motion vector difference (MVD). When the flag is 1, it indicates that the motion vector at the LOWER layer is used, and when the flag is 0, it indicates that another motion vector at the same layer is used.

The base mode flag is a flag that indicates whether motion information at the LOWER layer is used or not in displaying the motion information at the current layer. If the base mode flag is 1, the motion information at the LOWER layer is used as the motion information at the current layer, or a value obtained by refining the motion information at the LOWER layer is used as the motion information at the current layer. If the base mode flag is 0, it indicates that the motion information at the current layer is independently searched and recorded regardless of the motion information at the LOWER layer. The motion information includes a macroblock type (mb_type), a referencing direction of pictures at the time of inter-prediction (forward direction, reverse direction, and bidirection), and a motion vector.

There is a high probability that the flags having inter-layer correlation have the same value. Therefore, if high probability is considered in coding the flags for the macroblocks at the current layer, coding efficiency can be improved. In another exemplary embodiment of the present invention, a method is suggested in which the flag values for the macroblocks at the current layer are not directly coded, and a value obtained by performing an exclusive OR (XOR) operation between interlayer flag values is coded.

Figure 8:
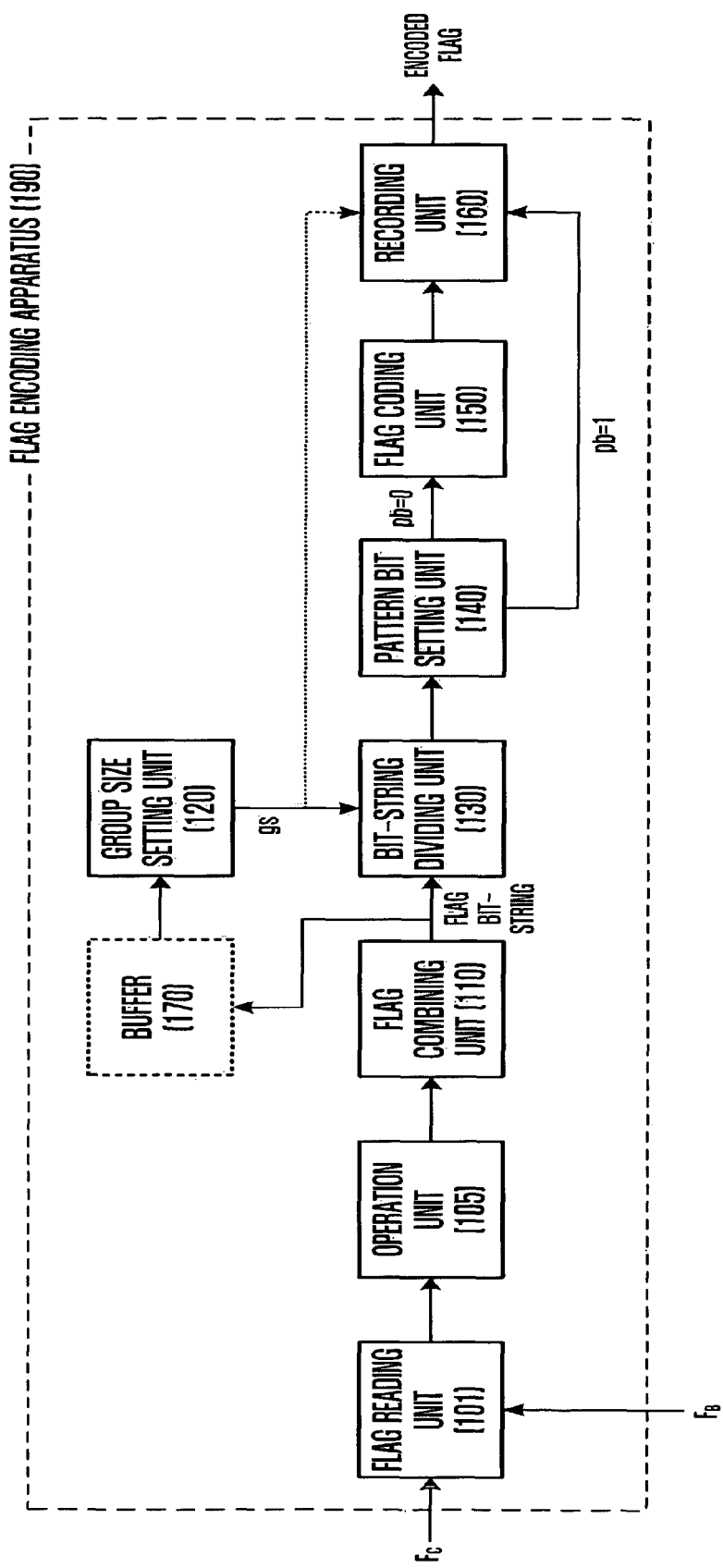
FIG. 8 is a block diagram illustrating a structure of a flag encoding apparatus according to an exemplary embodiment of the present invention.

FIG. 8 is a diagram illustrating a structure of a flag encoding apparatus 190 according to another exemplary embodiment of the present invention. If FIG. 8 is compared with FIG. 4, a flag reading unit 101 and an operation unit 105 are further included in FIG. 8.

The flag reading unit 101 reads a flag $F_C$ for a macroblock at a current layer and flag $F_B$ for a macroblock at a LOWER layer corresponding to the macroblock. The flags can be understood by parsing a macroblock header or reading a variable loaded on a memory.

The operation unit 105 performs an exclusive OR operation for the flags $F_C$ and $F_B$. As a result, because of inter-layer correlation, it is likely for 0 to be outputted. In this case, entropy decoding efficiency can be improved. After the operation result outputted by the operation unit 105 is inputted to the flag combining unit 110, since the processes are performed as shown in FIG. 4, the following processes are not described.

FIG. 9 is a flowchart illustrating an embodiment of FIG. 8.

First, the flag reading unit 101 reads the flags $F_C$ and $F_B$ (S19), and the operation unit 105 is inputted with the read flags $F_C$ and $F_B$ and performs an exclusive OR operation on them (S20).

Then, the group size setting unit 120 sets the group size gs (S21), and the bit-string dividing unit 130 divides the bit-string obtained from the operation result $R_C$ in a unit of the group size (S22).

The pattern bit setting unit 140 determines whether all the divided bit-strings are 0 (S23). In this case, if all the divided bit-strings are 0, the pattern bit setting unit 140 sets the pattern bit pb to 1 (S26), and if a portion of the divided bit-strings is not 0, the pattern bit setting unit 140 sets the pattern bit pb to 0 (S24).

When the pattern bit is set to 0, the flag coding unit 150 performs entropy coding on the divided bit-strings (S25). Lastly, if the steps are performed on all the macroblocks in the slice or frame (YES of S27), the process is completed, and if the steps are not performed on all the macroblocks in the slice or frame, the process proceeds to step S22.

Figure 10:
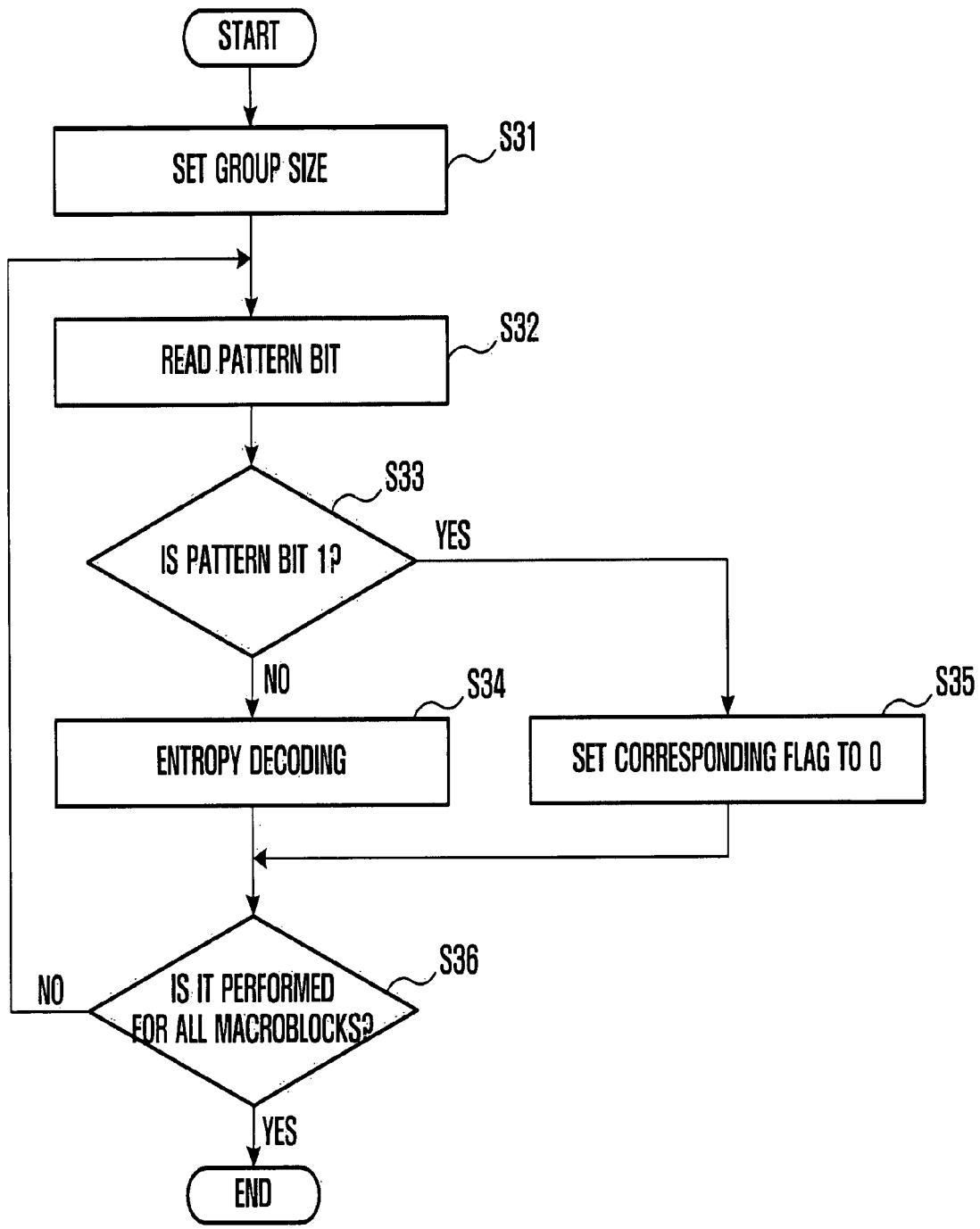
FIG. 10 is a flowchart illustrating a method of decoding a flag according to an exemplary embodiment of the present invention.

FIG. 10 is a flowchart illustrating a method of decoding flags according to an embodiment of the present invention.

First, the group size setting unit 210 sets the group size gs (S31). At this time, the group size setting unit 210 reads group size gs information contained in a video stream to set the group size. Alternatively, the group size setting unit 210 may set the group size through the distribution of previously restored flag values provided by the output buffer 240. In the case of the latter, the group size setting unit 210 calculates the group size in the same manner as the group size setting unit 120 of the flag encoding apparatus 100.

The pattern bit reading unit 220 reads the value of the pattern bit pb contained in the video stream (S32), and determines whether the value of the pattern bit pb is 0 or 1 (S33).

When it is determined that the value of the pattern bit pb is 1 (YES of S33), the flag setting unit 250 sets all the flags corresponding to the group size to 0 (S35).

In contrast, when it is determined that the value of the pattern bit pb is 0 (NO of S33), the flag decoding unit 230 reads encoded flag bit-strings for blocks as many as the set group size (the entropy-encoded result in the flag decoding apparatus 100) from the video stream, and performs entropy decoding on it (S34). The entropy decoding process is performed in reverse order of the entropy decoding process performed in the flag coding unit 150.

Lastly, if the above-mentioned steps are performed on all the macroblocks in the slice or frame (YES of S36), the process is completed, and if the above-mentioned steps are not performed on all the macroblocks, the process proceeds back to step S32.

Figure 11:
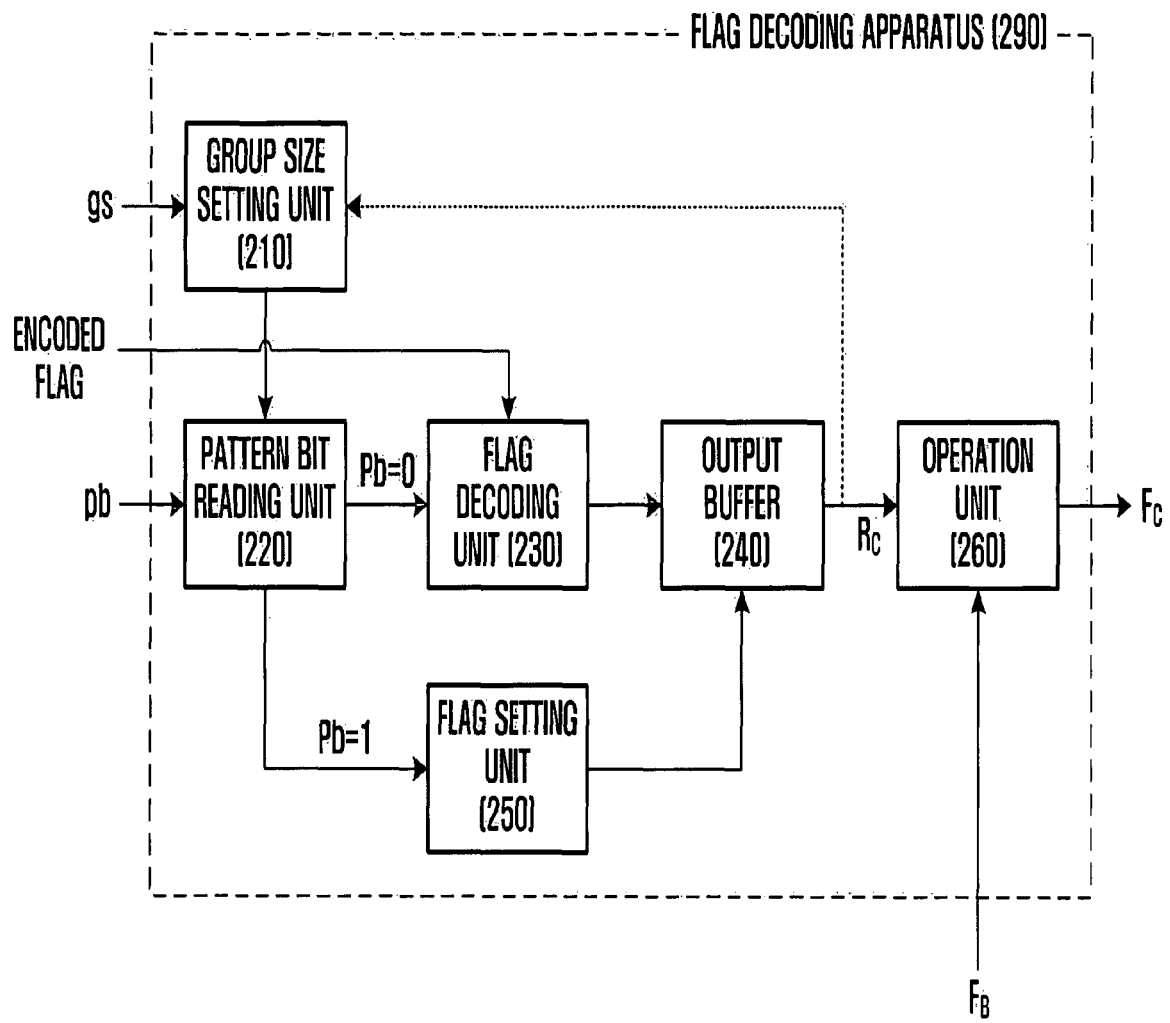
FIG. 11 is a block diagram illustrating a structure of a flag decoding apparatus according to an exemplary embodiment of the present invention.

Meanwhile, in a case in which the flags are encoded while considering inter-layer correlation as shown in FIG. 8, in order to perform a decoding process, some elements should be additionally provided in the structure shown in FIG. 5. FIG. 11 is a diagram illustrating a structure of a flag decoding apparatus 290 according to another exemplary embodiment of the present invention.

If FIG. 11 is compared with FIG. 5, only an operation unit 260 is additionally provided in FIG. 11. Since operations before an operation by the operation unit 260 are the same as those in FIG. 5, the description thereof will be omitted. The value outputted from the output buffer 240 corresponds to $R_C$ that is obtained by performing an exclusively OR operation for flags $F_C$ and $F_B$. The operation unit 260 performs an exclusively OR operation for the flags $F_B$ and $R_C$, and thus restores a specific flag $F_C$ for a macroblock at the current layer.

Figure 12:
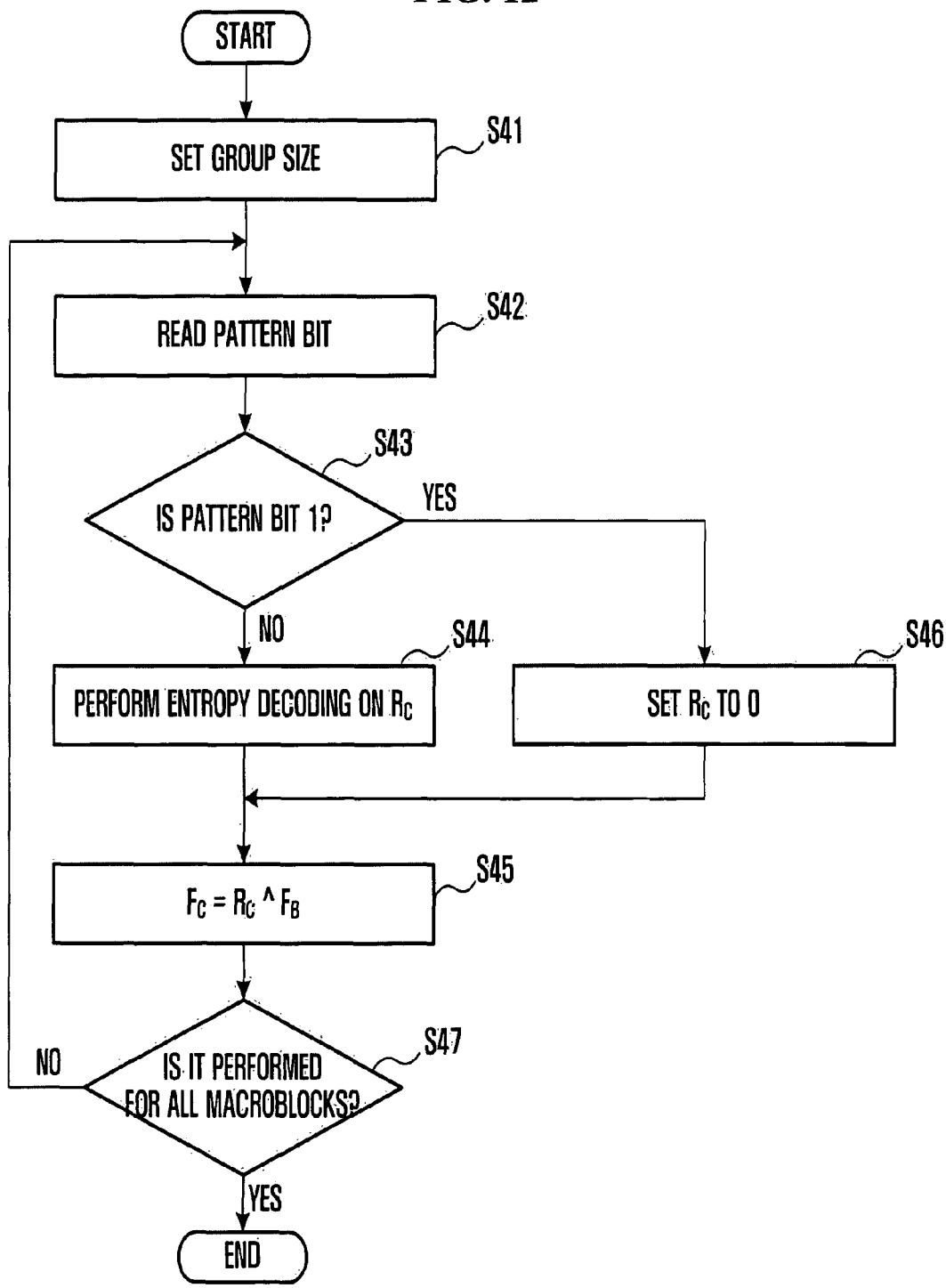
FIG. 12 is a flowchart illustrating a method of decoding a flag according to an exemplary embodiment of the present invention.

FIG. 12 is a flowchart illustrating an embodiment of FIG. 11.

First, the group size setting unit 210 sets the group size gs (S41). At this time, the group size setting unit 210 reads group size gs information contained in a video stream to set the group size. Alternatively, the group size setting unit 210 may set the group size through the distribution of previously restored flag values provided by the output buffer 240.

The pattern bit reading unit 220 reads the value of the pattern bit pb contained in the video stream (S42), and determines whether the value of the pattern bit pb is 0 or 1 (S43).

When it is determined that the value of the pattern bit pb is 1 (YES of S43), the flag setting unit 250 sets all data $R_C$ corresponding to the group size to 0 (S46).

In contrast, when it is determined that the value of the pattern bit pb is 0 (NO of S43), the flag decoding unit 230 reads the encoded data contained in the video stream, that is, $R_C$, by the group size, and performs entropy decoding on the read data (S44).

The operation unit 260 performs an exclusively OR operation for a flag value $F_B$ of the LOWER layer corresponding to $F_C$, and $R_C$ set to 0 in step S46 or $R_C$ having subjected to an entropy decoding process in step S44 (S45).

Lastly, if the above-mentioned steps are performed on all the macroblocks in the slice or frame (YES of S46), the process is completed, and if the above-mentioned steps are not performed on all the macroblocks, the process proceeds back to step S42.

Figure 13:
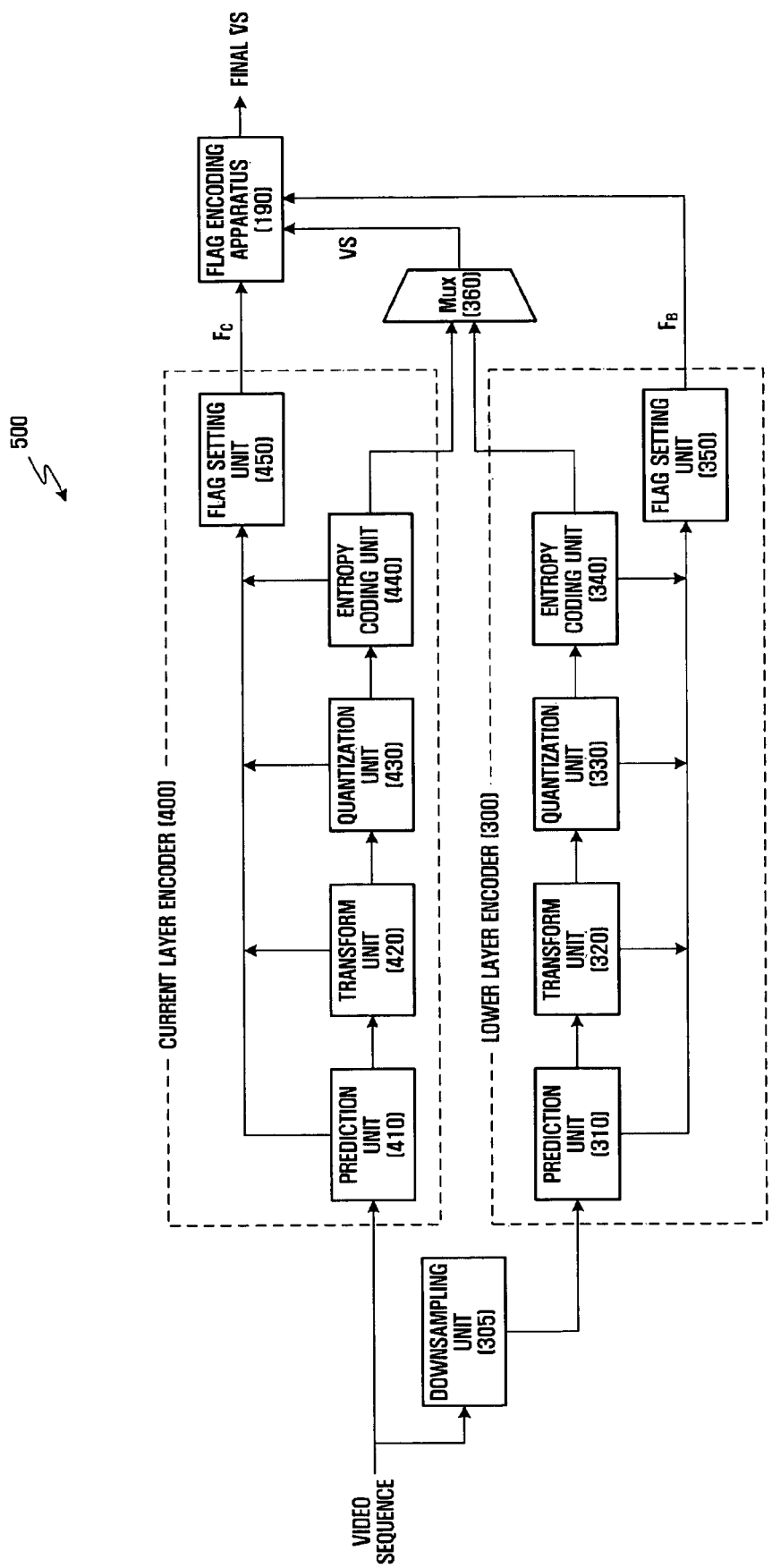
FIG. 13 is a block diagram illustrating a structure of a video encoder to which a flag encoding apparatus of FIG. 4 or 8 is applicable.

FIG. 13 is a block diagram illustrating a structure of a multi-layer based video encoder 500 to which the flag encoding apparatus 100 or 190 of FIG. 4 or 8 can be applied.

An original video sequence is inputted to a current layer encoder 400, then downsampled by a downsampling unit 305 (only when a resolution varies between layers), and then inputted to a LOWER encoder 300.

A prediction unit 410 calculates the difference of an image predicted in a current macroblock by a prediction method, and outputs a residual signal. Examples of the prediction method may include directional intra-prediction, inter-prediction, intra-base prediction, and residual prediction.

A TRANSFORM UNIT 420 converts the calculated residual signal by using a spatial transform method, such as DCT, wavelet transform, and the like, and thus creates a transform coefficient.

A quantization unit 430 quantizes the transform coefficient in a quantization step (when a quantization step size is large, data loss and a compression rate are high) and thus creates a quantization coefficient.

The entropy coding unit 440 performs losses coding on the quantization coefficient, and outputs a video stream at the current layer.

The flat setting unit 450 sets a flag on the basis of information obtained in various steps. For example, a residual prediction flag (residual_prediction_flag), an intra-base flag (intra_base_flag), and the like are set on the basis of information obtained from the prediction unit 410. The flags $F_C$ at the current layer that are set in the above-mentioned manner are inputted to the flag encoding apparatus 190.

Similar to the current layer encoder 400, the LOWER encoder 300 also includes a prediction unit 310, a TRANSFORM UNIT 320, a quantization unit 330, an entropy coding unit 340, and a flag setting unit 350. The entropy coding unit 340 outputs the video stream at the LOWER layer to a Mux 360 (multiplexer), and the flag setting unit 350 provides the flags $F_B$ at the LOWER layer to the flag encoding apparatus 190.

The Mux 360 combines the video stream at the current layer with the video stream at the LOWER layer so as to create a video stream VS, and provides it to the flag encoding apparatus 190.

The flag encoding apparatus 190 encodes the flag $F_C$ by using correlation between the provided flags $F_B$ and $F_C$, and inserts the encoded $F_C$ and the provided $F_B$ into the provided video stream so as to output a final video stream (final BS).

The flag encoding apparatus 190 may be substituted by the flag encoding apparatus 100. In this case, since inter-layer correlation is not used, the flags $F_C$ are subjected to an entropy coding process by using only spatial correlation without depending on the flags $F_B$.

Figure 14:
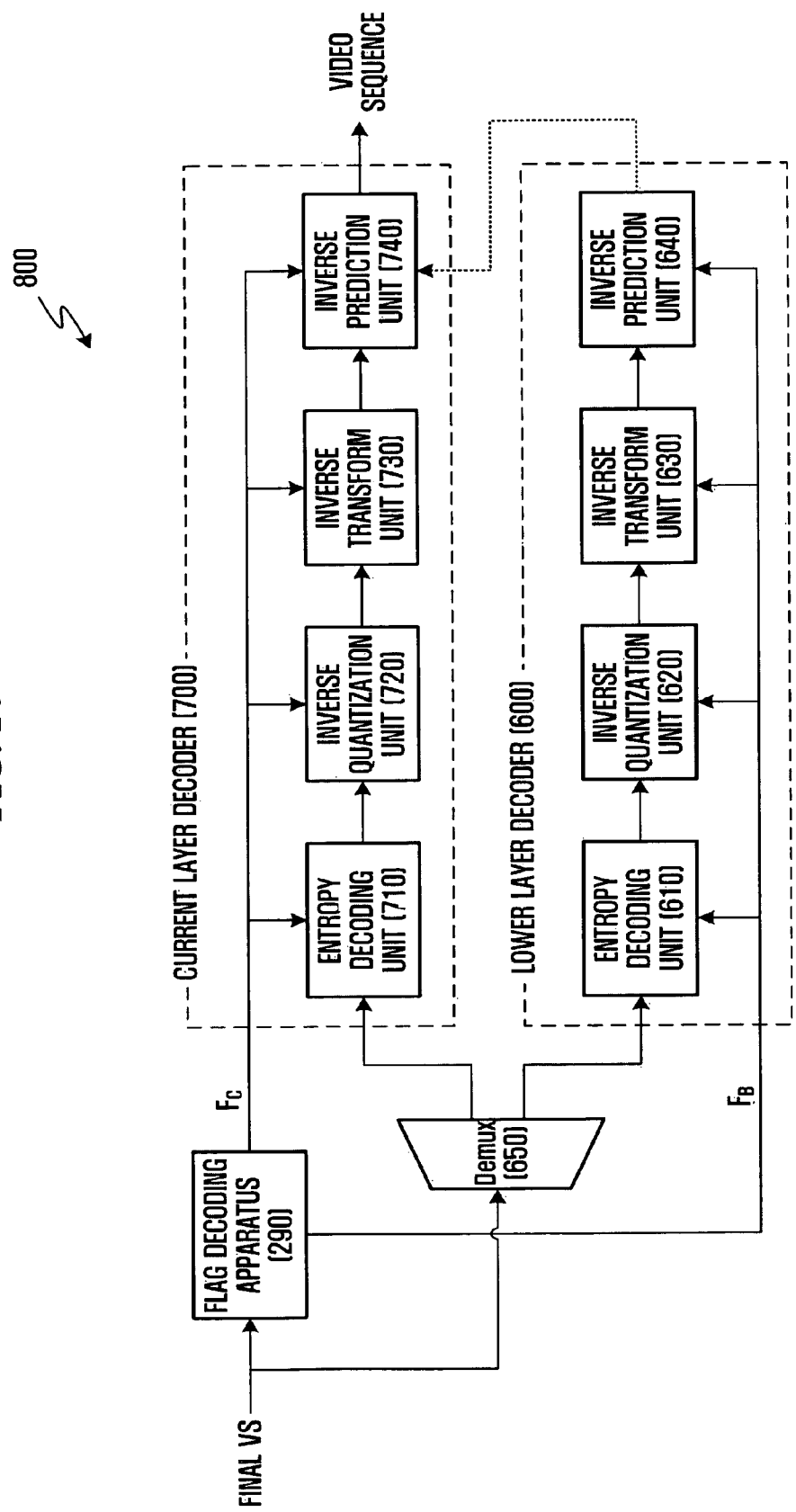
FIG. 14 is a block diagram illustrating a structure of a video decoder to which a flag encoding apparatus of FIG. 5 or 11 is applicable.

FIG. 14 is a block diagram illustrating a structure of a multi-layer based video encoder 800 to which the flag encoding apparatus 200 or 290 of FIG. 5 or 11 can be applied.

The inputted final video stream VS is inputted to the flag encoding apparatus 290 and a Demux 650 (demultiplexer). The Demux 650 separates the final video stream into the video stream at the current layer and the video stream at the LOWER layer, and then supplies them to the current layer encoder 700 and the LOWER decoder 600, respectively.

The entropy decoding unit 710 performs losses decoding in a method corresponding to the entropy coding unit 440, and restores the quantization coefficient.

An inverse quantization unit 720 performs inverse quantization on the restored quantization coefficient in the quantization step used in the quantization unit 430.

The inverse TRANSFORM UNIT 730 performs inverse conversion on the inversely quantized result by using an inverse spatial transform method, such as inverse DCT transform, inverse wavelet transform, and the like.

The inverse prediction unit 740 calculates a prediction image calculated by the prediction unit 410 in the same manner, and adds the calculated prediction image to the inversely converted result so as to restore a video sequence. At this time, the inverse prediction unit 740 uses the result decoded by the LOWER layer decoder 600 in specific cases (cases of intra-base prediction, residual prediction, and the like).

Similar to the current layer decoder 700, the LOWER layer encoder 600 also includes an entropy decoding unit 610, an inverse quantization unit 620, an inverse TRANSFORM UNIT 630, and an inverse prediction unit 640.

Meanwhile, the flag decoding apparatus 290 extracts the flags $F_B$ at the LOWER layer and encoded values of the flags $F_C$ at the current layer from the final video stream, and restores the flags $F_C$ at the current layer from the flags $F_B$ and the encoded values.

The extracted flags $F_B$ at the LOWER layer may be used in performing a corresponding operation in each of essential elements 610, 620, 630, and 640 of the LOWER layer decoder 600, and the restored flags $F_C$ at the current layer may be used in performing a corresponding operation in each of essential elements 710, 720, 730, and 740 of the current layer decoder 700.

The flag encoding apparatus 290 may be substituted by the flag encoding apparatus 200. In this case, since inter-layer correlation is not used, and the flags $F_C$ are subjected to an entropy decoding process by using only spatial correlation without depending on the flags $F_B$.

The respective components shown in FIGS. 4, 5, 8, 11, 13, and 14 may be implemented by software, such as tasks, classes, sub-routines, processes, objects, executing threads, programs, and the like, which can be executed in a predetermined region of a memory, or hardware, such as a Field Programmable Gate Array (FPGA) or an Application Specific Integrated Circuit (ASIC), or a combination of the hardware and the software. The respective components may be contained in storage medium readable by a computer or portions thereof may be distributed in a plurality of computers.

Although the present invention has been described in connection with the exemplary embodiments of the present invention, it will be apparent to those skilled in the art that various modifications and changes may be made thereto without departing from the scope and spirit of the present invention. Therefore, it should be understood that the above embodiments are not limitative, but illustrative in all aspects.

According to the method of encoding flags, the method of decoding flags, the apparatus thereof according to exemplary embodiments of the present invention, it is possible to improve encoding efficiency of various flags that are used in a multi-layer based scalable video codec.

What is claimed is:

1. A method of encoding flags that is used for coding a video frame having a plurality of blocks, the method comprising:
    collecting flag values respectively allocated to groups of the plurality of blocks according to spatial correlation of the groups of the plurality of blocks to create a flag bit-string;
    dividing the flag bit-string into a plurality of divided bit-strings using a group size;
    setting a pattern bit indicating whether all bits included in the divided bit-strings are 0 or not; and
    performing entropy coding on the divided bit-strings according to the set pattern bit.

2. The method of claim 1, wherein the blocks are slices, macroblocks, or sub-blocks.

3. The method of claim 1, wherein the group size is any one of 4, 8, or 16.

4. The method of claim 1, wherein the group size is determined by comparing a ratio of 0 bits included in bits of the divided bit-strings to total bits included in the divided bit-strings with threshold values.

5. The method of claim 4, wherein the threshold values are ⅓ and ⅘.

6. The method of claim 5, wherein when the ratio of 0 bits included in bits of the divided bit-strings to total bits included in the divided bit-strings is smaller than ⅓, the group size is determined as 0, when the ratio of 0 bits included in bits of the divided bit-strings to total bits included in the divided bit-strings is larger than ⅘, the group size is determined as 8, and in the other cases, the group size is determined as 4.

7. The method of claim 1, wherein the flag is a residual prediction flag or a coded block pattern (cbp) flag.

8. The method of claim 1, wherein the pattern bit is recorded on a header of the block, and the group size is recorded on a slice header.

9. A method of decoding flags that are used for coding a video frame having a plurality of blocks, the method comprising:
   reading from the video stream a pattern bit indicating whether all bits included in a flag bit-string are 0 or not,
   setting, when the pattern bit has a first bit, a flag bit-string corresponding to a group size to 0;
   reading, when the pattern bit has a second bit, an encoded flag bit-string for blocks according to the group size from the video stream; and
   performing entropy decoding on the read flag bit-string.

10. The method of claim 9, wherein the blocks are slices, macroblocks, or sub-blocks.

11. The method of claim 9, wherein the group size is read from the video stream.

12. The method of claim 9, wherein the group size is determined by comparing a ratio of 0 bits included in bits of the flag bit-string to the total bits in the flag bit-string with threshold values.

13. The method of claim 12, wherein the threshold values are ⅓ and ⅘.

14. The method of claim 13, wherein when the ratio of 0 bits included in bits of the flag bit-string to the total bits in the flag bit-string is smaller than ⅓, the group size is determined as 0, when the ratio of 0 bits included in bits of the flag bit-string to the total bits in the flag bit-string is larger than ⅘, the group size is determined as 8, and in the other cases, the group size is determined as 4.

15. The method of claim 9, wherein the flag is a residual prediction flag or a coded block pattern (cbp) flag.

16. The method of claim 6, further comprising performing an exclusive OR operation for the flag bit-string set to 0 during the setting of the flag bit-string to 0 or the entropy-decoded flag bit-string during the performing of entropy coding on the read flag bit-string and a corresponding flag bit-string at a LOWER layer.

17. An apparatus for encoding flags that are used for coding a video frame having a plurality of blocks, the apparatus comprising:
   a bit-string creating unit which collects flag values respectively allocated to groups of the plurality of blocks according to spatial correlation of the groups of the plurality of blocks to create a flag bit-string;
   a bit-string dividing unit which divides the flag bit-string into a plurality of divided bit-strings using a group size;
   a pattern bit setting unit which sets a pattern bit indicating whether all bits included in the divided bit-strings are 0 or not; and
   an entropy coding unit which performs entropy coding on the divided bit-strings according to the set pattern bit.

18. An apparatus for decoding flags that are used for coding a video frame having a plurality of blocks, the apparatus comprising:
   a pattern bit reading unit which reads from the video stream a pattern bit which indicates whether all bits included in a bit-string are 0 or not,
   a flag bit-string setting unit, which sets a flag bit-string corresponding to a group size to 0 when the pattern bit has a first bit;
   a flag bit-string reading unit, which reads an encoded flag bit-string for blocks according to the group size from the video stream when the pattern bit has a second bit; and
   an entropy decoding unit which performs entropy decoding on the read flag bit-string.

* * * * *